United States Patent [19]
Johansen

[11] Patent Number: 5,347,606
[45] Date of Patent: Sep. 13, 1994

[54] METHOD AND AN ARRANGEMENT FOR SPLICING OPTICAL WAVEGUIDES

[75] Inventor: Lars Johansen, Haninge, Sweden

[73] Assignee: Televerket, Farsta, Sweden

[21] Appl. No.: 996,313

[22] Filed: Dec. 23, 1992

[30] Foreign Application Priority Data

Jan. 13, 1992 [SE] Sweden ............................ 92000702

[51] Int. Cl.$^5$ ............................................ G02B 6/38
[52] U.S. Cl. ...................................... 385/95; 385/99
[58] Field of Search ........................... 385/95-99, 385/73, 38, 135

[56] References Cited

U.S. PATENT DOCUMENTS

| | | |
|---|---|---|
| 3,455,625 | 7/1969 | Brumley et al. |
| 3,681,164 | 8/1972 | Bazinet et al. |
| 4,662,962 | 5/1987 | Malavieille . |
| 4,728,170 | 3/1988 | Robertson ............................ 385/96 |
| 4,746,189 | 5/1988 | Arrington et al. ..................... 385/97 |
| 4,919,510 | 4/1990 | Hoke et al. .......................... 385/95 |
| 4,971,418 | 11/1990 | Dorsey et al. ....................... 385/96 |

FOREIGN PATENT DOCUMENTS

| | | |
|---|---|---|
| 0171614 | 2/1986 | European Pat. Off. . |
| 0381766 | 8/1990 | European Pat. Off. . |
| 1500026 | 2/1978 | United Kingdom . |
| 1602587 | 11/1981 | United Kingdom . |
| 2136147 | 9/1984 | United Kingdom . |
| 2143650 | 2/1985 | United Kingdom . |
| 2144239 | 2/1985 | United Kingdom . |
| 2174506 | 11/1986 | United Kingdom . |
| 2253715 | 9/1992 | United Kingdom . |

Primary Examiner—Rodney B. Bovernick
Assistant Examiner—John Ngo
Attorney, Agent, or Firm—Oblon, Spivak, McClelland, Maier & Neustadt

[57] ABSTRACT

The invention relates to a method and an arrangement for splicing optical waveguides and, more specifically, for effecting such splicing under field conditions i.e. directly in cable pits where the waveguides requiring splicing are housed. In accordance with the invention, a solidifiable refractive-index matching means is used to effect the splicing. The index-matching means is applied between the ends of the two waveguides in a support arrangement and is then solidified to form a splice having optical, ageing and temperature characteristics substantially corresponding to those of the waveguides. The temperature at which solidification is effected can be such that the refractive index-matching means is sintered to form a glass splice. The index-matching means is preferably a silica gel which can be solidified either chemically or by the application of heat.

3 Claims, 1 Drawing Sheet

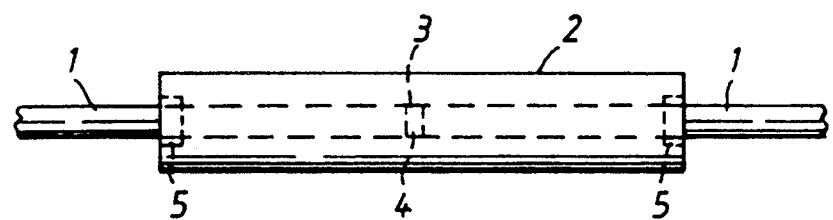
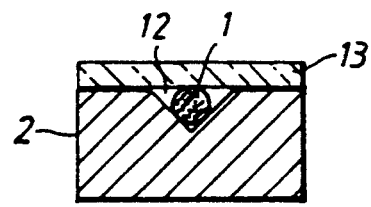

METHOD AND AN ARRANGEMENT FOR SPLICING OPTICAL WAVEGUIDES

BACKGROUND OF THE INVENTION

The invention relates to a method and an arrangement for splicing optical waveguides and, more specifically, for effecting such splicing under field conditions i.e. directly in cable pits where the waveguides requiring splicing are housed.

It is known to splice optical waveguides, such as optical fibres, by means of automatic welding. However, automatic welding requires a high temperature, approximately 2000° C., and a clean environment. The welding must, therefore, be carried out in an enclosed environment, such as a special caravan which is transported to the site where the optical fibres requiring splicing are located. It is a requirement of such an arrangement that the optical fibres which are usually housed in a cable pit in the ground, have sufficiently long loops so that they can be drawn into the caravan for splicing. Even though a good splice is obtained with this arrangement, the technology is expensive because of the need to use special equipment. Furthermore, it is not always possible to transport the special caravan to all possible locations where the splicing of optical fibres needs to be effected.

Purely mechanical splices have also already been used, that is to say, the ends of the two optical fibres requiring splicing are enclosed within a capsule and placed against one another with an air gap therebetween. This arrangement can cause losses in the splice because in cutting the ends of the fibres in readiness for splicing, the cut surfaces at the ends of the fibres are not quite perfect and this creates reflection and attenuation with each change in the refractive index at the splice. It is known to alleviate these problems by filling the air gap with refractive index-matching means, for example, silicon oils or epoxy cements. With silicon oils which are free flowing, leakage can occur. Moreover, the silicon oils and the optical fibre waveguides have different temperature characteristics. There are also problems with different ageing characteristics. The use of epoxy cements for splicing optical waveguides which give rise to similar problems to the ones outlined above for silicon oils, can be a health hazard in that they emit vapours that can be damaging to health.

It is an object of the present invention to overcome the foregoing problems with known splicing arrangements by the provision of a method and an arrangement for splicing optical waveguides, such as optical fibres, that can be effected in the field, for example, in the cable pits in which the waveguides are housed and that produces splices which have good refractive index matching and thereby relatively low losses and which have optical, ageing and temperature characteristics similar to those of the optical waveguides.

SUMMARY OF THE INVENTION

The invention provides a method for splicing optical waveguides comprising the steps of providing a support arrangement for the waveguides, supporting the ends of the waveguides requiring splicing in the support arrangement with a solidifiable refractive index-matching means applied between the ends of the waveguides, and solidifying the refractive index-matching means to form a splice having optical, ageing and temperature characteristics substantially corresponding to those of the optical waveguides.

The invention also provides an arrangement for splicing optical waveguides comprising a support arrangement for supporting, and fixing the position of, the ends of the waveguides requiring splicing and a solidifiable refractive-index matching means applied between the ends of the waveguides in the support arrangement wherein the optical; ageing and temperature characteristics of the waveguides substantially correspond to those of the refractive index-matching means after solidification.

The solidification of the refractive index-matching means can be effected chemically by the use of a catalyst or by the application of heat.

The refractive index-matching means can be provided by silica gel which can be solidified by the application of heat and which can be sintered to form a glass splice.

The foregoing and other features according to the present invention will be better understood from the following description with reference to the accompanying drawings, in which:

FIG. 1 illustrates, in a side elevation, an arrangement according to the present invention for splicing two optical fibre waveguides, and FIG. 2 illustrates, in a cross-sectional elevation, an alternative arrangement according to the present invention for splicing two optical fibre waveguides.

DESCRIPTION OF THE PREFERRED EMBODIMENTS OF THE INVENTION

As illustrated in FIG. 1 of the drawings, an arrangement according to the present invention for splicing two optical fibre waveguides includes a support arrangement 2 which is preferable in the form of a tube and which has a through hole into each end of which respective ones of two optical fibres 1 are inserted. The intermediate space 3 between the ends of the optical fibres 1 is filled with a refractive index-matching gel 4. The same gel is also used to effect the sealing of the optical fibres 1 in the support arrangement 2 at the ends 5 thereof.

With this arrangement, the gel is placed in the through hole of the support arrangement 2 and the ends of the optical fibres 1 are then inserted into the hole, one in each end thereof. This causes the gel to fill the space 3 between the ends of the optical fibres 1 and to seal the fibres in the support arrangement 2 at the ends 5 thereof. The gel is then suitably solidified in the manner outlined below to form a splice.

An alternative arrangement according to the present invention for splicing two optical fibre waveguides is illustrated in FIG. 2 of the drawings and includes a support arrangement 2 having a V-shaped groove 12 formed in one surface thereof. The optical fibres 1 are located, in alignment, in the groove 12 with the space between the ends of the fibres filled with a refractive index-matching gel (not shown). The gel can be applied either before or after the optical fibres 1 are located in the groove 12. After the two optical fibres 1 and the gel 4 are placed in the groove 12, a cover 13 which can be made of thin glass, is then placed over the groove 12 to enclose the ends of the optical fibres 1 and the gel located therebetween. The cover 13 is held in position by adhesion to the gel. Alternatively, a snap-on cover could be used in place of the illustrated cover 13. Furthermore, the cross-section of the groove 12 could be of a shape other than V-shaped. After the cover 13 is in place, the gel is then suitably solidified in the manner outlined below to form a splice.

With the arrangement according to the present invention, the refractive index-matching means can be provided by a gel, namely, silica gel, which can be solidified i.e. hardened, to form a splice between the ends of the optical waveguides by the application of heat. Alternatively, refractive index-matching gels can be used which can be solidified i.e. hardened, chemically by means of a catalyst, for example, alkoxide.

With silica gels, solidification can, as mentioned above, be effected by the application of heat. In one embodiment of the invention, a silica gel is heated to a temperature at which the moisture content of the silica gel is evaporated and a non-flowing splice is formed between the ends of the optical fibre waveguides 1. This splice has a refractive index and other characteristics that substantially correspond to those of the material from which the optical fibre waveguides are formed. For the silica gel to solidify, no especially high temperature is required and approximately 100° C. is sufficient to effect solidification. Thus, the heating of the silica gel can be effected with a simple burner or an electrical heating arrangement.

To obtain a splice of even higher quality, the silica gel can be heated to a higher temperature i.e. in the range 200° C. to 1000° C. By this means, the silica gel is sintered into quartz. By selecting a suitable silica gel, a splice can be obtained which will have the same characteristics as the material from which the spliced optical fibres is formed.

There are, as stated above, refractive index-matching gels which can be solidified by the addition of a catalyst to the gel. With this arrangement, the hardening of the gel is effected chemically and the application of heat to the splice is not required.

Naturally, the invention does not need to be applied outside in the field but can also be applied, for example, in equipment with fibre optics where the space in which splicing is to be effected is limited and a simple splice is required. Furthermore, the arrangement according to the present invention can also be used for the splicing of optical waveguides, for example, optical fibres, having different cross-sectional dimensions.

The method and arrangement according to the present invention for splicing optical waveguides provides may advantages. The use of a support arrangement 2 results in a splice that is mechanically rigid and due to the presence of the hardened index-matching means cannot readily come apart. Furthermore, no leakage is possible since the index-matching means is not free flowing. By selecting a gel which, when it is sintered, is of the same material as the optical fibre, optimum matching of optical, ageing and temperature characteristics can be obtained. The invention does not make any special demands on the environment but can be carried out in existing cable pits with uncomplicated, inexpensive and reliable equipment.

We claim:

1. An arrangement for splicing optical waveguides comprising a support member for supporting the ends of the waveguides requiring splicing, one surface of the said member having a groove formed therein in which the ends of the waveguides are located, in alignment, in a spaced-apart relationship, a solidifiable refractive index-matching means in the space between the ends of the waveguides, a cover for enclosing the ends of the waveguides and the refractive index-matching means in the groove, means for regaining the cover in position wherein said solidifiable refractive index-matching means adheres to said support member after said refractive index matching means solidified.

2. An arrangement as claimed in claim 1 wherein the cover is retained in position by adhesion to the refractive index-matching means.

3. An arrangement as claimed in claim 1 wherein the cross-section of the groove is V-shaped.

* * * * *